United States Patent [19]

Perkins et al.

[11] Patent Number: 5,314,265

[45] Date of Patent: May 24, 1994

[54] WASTE DISPOSAL IN HYDRAULICALLY FRACTURED EARTH FORMATIONS

[75] Inventors: Thomas K. Perkins, Dallas; Richard G. Keck, Plano, both of Tex.

[73] Assignee: Atlantic Richfield Company, Los Angeles, Calif.

[21] Appl. No.: 32,951

[22] Filed: Mar. 17, 1993

[51] Int. Cl.⁵ ................................................ B09B 3/00
[52] U.S. Cl. ................................. 405/128; 166/305.1; 175/66; 405/53; 588/250
[58] Field of Search .............. 405/128, 53-59; 175/66, 206; 588/249, 250; 166/305.1, 308

[56] References Cited

U.S. PATENT DOCUMENTS

| | | | |
|---|---|---|---|
| 4,942,929 | 7/1990 | Malachosky et al. | 405/128 X |
| 5,085,277 | 2/1992 | Hopper | 405/128 X |
| 5,108,226 | 4/1992 | Jennings | 405/128 |
| 5,129,469 | 7/1992 | Jackson | 405/128 X |

Primary Examiner—Dennis L. Taylor
Attorney, Agent, or Firm—Michael E. Martin

[57] ABSTRACT

Slurries of relatively fine particles of solids wastes and similar materials are disposed of through injection wells which penetrate earth formation disposal zones which have a minimum in situ compressive stress generally less than an overburden zone and an underburden zone adjacent to the disposal zone. The disposal zone preferably has a permeability greater than the overburden and underburden zones. The slurry is injected through a disposal well intersecting all of the zones and having perforations preferably communicating the slurry with the underburden zone to provide for lateral growth of the hydraulically fractured disposal zone as the solids filter cake plates out on the fracture faces of the disposal zone without substantially penetrating the overburden zone.

16 Claims, 1 Drawing Sheet

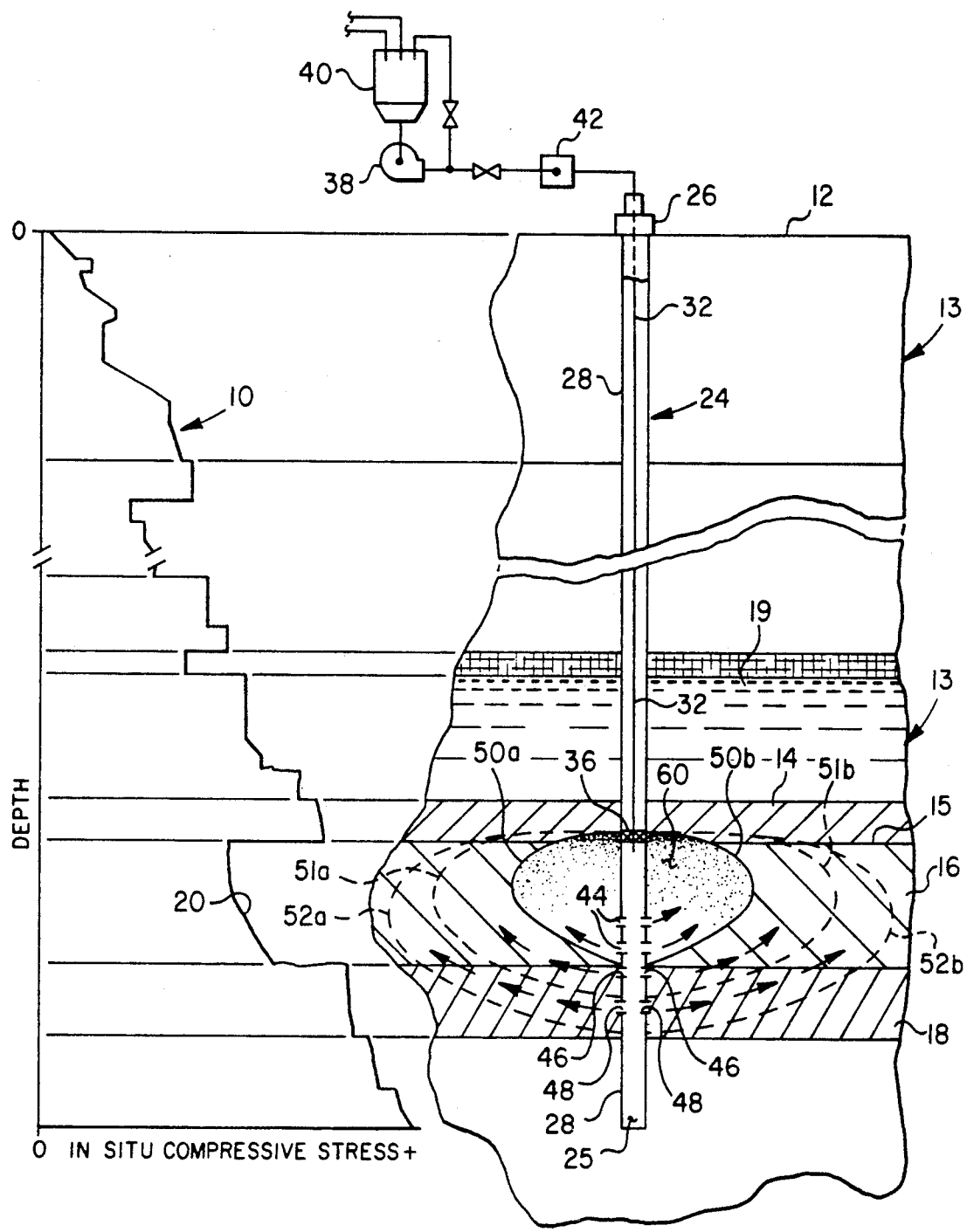

WASTE DISPOSAL IN HYDRAULICALLY FRACTURED EARTH FORMATIONS

BACKGROUND OF THE INVENTION

1. Field of the Invention

The present invention pertains to disposal of slurried solids wastes and the like in a hydraulically fractured earth formation in a relatively permeable disposal zone disposed below a relatively impermeable overburden zone and above an underburden zone having higher in situ compressive stresses than the disposal zone.

2. Background

One suitable way of disposing of solid waste materials comprises reducing the particle size of the solids material, slurrying the finely ground solids with a suitable disposal or carrier liquid and injecting the slurry into a relatively deep earth formation zone which will prevent uncontrolled movement of the waste material into zones from which fluids such as fresh water may be produced. U.S. Pat. No. 4,942,929, issued Jul. 24, 1990, to Malachosky, et al and U.S. Pat. No. 5,109,933, issued May 5, 1992, to James E. Jackson, both assigned to the assignee of the present invention and U.S. Pat. No. 5,108,226, issued Apr. 28, 1992 to Jennings, Jr. describe methods for disposing of slurries of solids particles and a suitable carrier liquid such as fresh or salt water by injection of the slurries into deep wells and fracturing an earth formation to provide for disposal of a suitable quantity of the waste material.

Moreover, U.S. patent application Ser. No. 07/910,381, filed Jul. 8, 1992, in the name of Thomas K. Perkins and U.S. patent application Ser. No. 08/008,375, filed Jan. 25, 1993 to Winton G. Aubert, et al, both assigned to the assignee of the present invention, describe certain improvements in techniques for disposal of liquid and slurried solids waste in deep earth formation disposal zones. The method described in application Ser. No. 07/910,381 is unique in that formation zones having alternate layers of permeable and relatively impermeable material may be advantageously utilized to dispose of relatively large quantities of slurried solids wastes. However, deep earth disposal zones which have the characteristics which may be taken advantage of in the method described and claimed in application Ser. No. 07/910,381 may not be readily available in locations which may otherwise be desired for disposing of wastes which generally comprise slurries of relatively small particles of solids material.

It is more common to find earth formations having one or more relatively permeable zones of substantial thickness or vertical span which are located below a formation zone comprising overburden of relatively impermeable material and which may exhibit an in situ compressive stress field generally greater than the more permeable zone. Such formations also, generally, exhibit gradual or significantly increasing in situ compressive stress with depth even though certain zones at different depths may have relatively lower in situ compressive stresses than either the overburden or the underburden of the particular zone in question. Such earth formation zones may be advantageously used for the disposal of slurried solids wastes in accordance with the present invention.

SUMMARY OF THE INVENTION

The present invention provides an improved method for disposing of slurried solids wastes and the like through injection into hydraulically fractured earth formations.

In accordance with one important aspect of the present invention, relatively fine particles of solids wastes are disposed of by forming a slurry of the solids and injecting the slurry into a disposal zone having a relatively low in situ horizontal compressive stress and being relatively permeable and wherein the disposal zone is bounded by relatively impermeable overburden and underburden zones.

In accordance with another important aspect of the present invention, slurried solid wastes are injected into a relatively permeable earth formation disposal zone which exhibits relatively low in situ compressive stress and is bounded by overburden and underburden zones which exhibit horizontal in situ compressive stresses which are generally higher than the disposal zone and wherein the in situ stress in the underburden is greater than in the overburden. The method of the invention also may advantageously utilize the formation characteristic wherein the overburden is a relatively impermeable material compared to the underburden.

The unique method of the present invention takes advantage of the accumulation of solids in the fracture(s) and along the interface between the overburden zone and the disposal zone which limits the upward vertical growth of the fracture(s) while at the same time the fracture(s) may grow generally laterally from a wellbore at least partially through the underburden zone. Suitable wellbore perforations into the underburden zone and also into the lower part of the disposal zone are provided with a view to permitting lateral fracture extension without termination of fracture growth due to plugging of the disposal zone by the solids waste material.

The improved method of the present invention also allows relatively large volumes of solids wastes in slurry form to be injected into a single well while preventing unrestrained growth of a hydraulic fracture into an overburden zone above the disposal zone. The cost per unit volume of waste material disposed of is reduced and the method of the invention allows greater flexibility in selecting sites for disposal of solids wastes in hydraulic fractured earth formations.

Those skilled in the art will recognize the above-mentioned advantages and superior features of the invention together with other important aspects thereof upon reading the detailed description which follows in conjunction with the drawing.

BRIEF DESCRIPTION OF THE DRAWING

The drawing FIGURE comprises a stress versus depth diagram in conjunction with a schematic of a disposal well and a hydraulically fractured disposal zone for slurried solids wastes, in accordance with the present invention.

DESCRIPTION OF A PREFERRED EMBODIMENT

In the description which follows, like elements are marked with the same reference numerals throughout the specification and drawing. The drawing figure illustrates certain features in somewhat schematic form to better illustrate the invention.

As described in U.S. patent application Ser. No. 07/910,381, the subject matter of which is incorporated herein by reference, it is widely accepted that the in situ compressive stresses in the earth increase, generally, with depth. There are, however, certain zones or layers of earth material at various depth which, for one reason or another, exhibit in situ compressive stresses which are generally lower than zones above, as well as below, the zone in question. Such disposal zones may be suitable for disposal of slurried solids wastes, as well as certain liquid wastes, since the generally higher compressive stresses in the overburden zone as well as the underburden zone will prevent significant vertical growth of a hydraulic fracture out of the disposal zone. Since it is widely accepted that the compressive stresses in the earth in the vicinity of fluid injection into a formation will typically result in the development of a vertical, two-winged fracture extending laterally from a wellbore in opposite directions and in a plane generally normal to the minimum in situ horizontal compressive stress, this type of fracture development may be used as a way of disposing of slurried solids and certain liquid waste materials as long as the fracture does not intersect a zone from which certain fluids, including fresh water, may be produced or otherwise flow back to the surface.

The present invention contemplates the formation of hydraulic fractures which extend generally laterally away from a vertical or near vertical well penetrating an earth formation. The fractures are considered to extend generally in a vertical plane in opposite directions from the well to form the so-called vertical two-winged fracture. Those skilled in the art will, however, recognize that the invention may be carried out in earth formations wherein the fractures, as well as the wellbores, extend in directions other than vertical. So-called vertical fractures are shown in the drawing figure for purposes of illustration only.

One inherent characteristic of hydraulically fractured earth formations is that the fracturing fluid will typically leak off from the fracture faces into the formation being fractured, leaving behind any entrained or slurried solids to build up on the fracture faces as a "filter cake". This process will, eventually, plug the fracture faces and cause an increase in fluid pressure due to resistance to flow and growth of the fracture. However, this somewhat inherent characteristic of hydraulic fracturing with solids-laden fluids may be used as an advantage in disposing of certain materials through a disposal well by pumping such materials into hydraulically fractured earth formations.

The drawing figure illustrates on the left side a diagram indicating the magnitude of the minimum in situ compressive stress in the earth as a function of depth. The diagram shows a line 10 indicating the general magnitude of the minimum in situ compressive stress which generally increases with depth below the earth's surface 12. However, as indicated in the diagram, certain zones or regions of the earth comprising layers of different shales or sands, for example, will exhibit somewhat lower stresses than regions or zones both above and below the zone in question. The drawing figure also illustrates, on the right hand side, a schematic of a generally vertical section through an earth formation 13 below the surface 12 showing different zones or layers of earth material such as an overburden layer 14, a waste disposal zone or layer 16 below the overburden layer 14 and an underburden layer or zone 18, by way of example. As indicated in the stress versus depth diagram, the in situ compressive stress in the disposal zone 16 is generally lower, as indicated by the line segment 20, than the stresses in the overburden layer 14 or the underburden layer 18. The measurement of the stress levels may be carried out using conventional techniques in the art of well drilling and exploration. For example, certain logging devices may be inserted in a wellbore penetrating the formation 13 and measurements taken which show a correlation between the measurement value and the earth's in situ compressive stress. Other techniques involve taking core samples of the earth at various depths and analyzing these core samples in a suitable laboratory setting to evaluate the in situ stress at the depth at which the core was obtained.

Referring further to the drawing figure, the earth formation 13 is penetrated by a disposal well, generally designated by the numeral 24. The disposal well 24 may have a conventional wellhead 26 from which extends a casing or liner 28. Fluids, including slurries of solids particulates, may be injected into the well 24 through a tubing string 32 extending within the casing 28. A suitable seal such as a packer 36 is provided to confine flow of fluid in the wellbore space 25 and prevent flow of fluid through the annular area between the tubing string 32 and the casing 14. A slurry of relatively finely ground solids particulates and a carrier liquid such as water may be prepared by mixing and circulating the solids and carrier liquid through a system including a centrifugal pump 38 and a receiving and storage tank 40. Properly prepared slurries may then be injected into the well 24 through the tubing string 32 by a conventional high-pressure reciprocating pump 42. The system for preparing and injecting the slurried solids is exemplary but is suitable for the preparation and injection of many types of solids as described in U.S. Pat. No. 5,109,933.

The disposal zone 16 is selected after determining the in situ compressive stress characteristic versus depth and also after measuring the permeability of the zones or layers of earth including the overburden layer 14, the disposal zone or layer 16 and the underburden layer 18. It is, for example, desirable that the disposal zone 16 have a permeability which is greater than the overburden and underburden zones 14 and 18. The permeability measurements may also be taken using conventional methods for measuring permeability known to those skilled in the art of producing fluids from subterranean formations through wells.

When the desired disposal zone 16 has been defined, that is a zone which is bounded by zones 14 and 18 of relatively lower permeability and higher compressive stresses, the preferred method of the present invention includes providing suitable sets of perforations 44, 46 and 48 in the casing 28, using known perforating techniques. Although the well 24 may be uncased through the portion of the wellbore penetrating the zones 16 and 18, in particular, the control over the growth of fractures in accordance with the method of the invention is easier to accomplish by placing a set of perforations 44 near the lower boundary of the zone 16 and placing sets of perforations 46 and 48 generally vertically spaced in the underburden layer or zone 18. This placement of the perforations will improve the development of a suitable two-winged fracture which will extend in a generally vertical plane in a direction normal to the minimum in situ horizontal compressive stress. It may be desirable to provide only the perforations 46 and/or 48 communicating with the underburden zone 18 as will be discussed further hereinbelow.

The drawing figure illustrates a fracture having opposed fracture "wings" 50a and 50b which are shown developing in such a way that the upper limit of the fracture has only slightly penetrated past the interface 15 between the overburden zone 14 and the disposal zone 16. It is contemplated that in accordance with the present invention, the fracture wings 50a and 50b will grow or enlarge in such a way that the upper boundary of the fractures will not penetrate substantially into the zone 14 or through the zone and will not invade zones such as a zone 19 which may bear producible water or other fluids. In fact, in accordance with the present invention, it is contemplated that the fractures will grow such that the boundaries will be progressively defined by the lines 51a and 51b and further growth will cause the fracture to be delimited by the boundaries 52a and 52b, as illustrated. Of course, the fracture wings may grow horizontally away from the well 24 somewhat unevenly due to variations in the compressive stress field of the zone 16 on either side of the well. However, in accordance with the present invention, the fracture boundaries 51a, 51b, and 52a, 52b will also grow generally downwardly into the underburden zone 18 as the disposal fluid is pumped into the well and through the perforations 46 and 48. In this way substantial quantities of solids-laden disposal fluids or slurries of solids wastes may be suitably disposed of in an earth formation from which these materials will not migrate.

In fact, the method of the present invention takes advantage of the above-described occurrence of filter cake plugging of the fracture faces and the fact that the in situ compressive stresses increase generally with the depth of the formation into which injection is taking place. Initially, for example, as the disposal slurry is pumped into the well and through the perforations 44, the fracture wings 50a and 50b will develop and grow in such a way that the upper boundary of the fractures will not penetrate substantially into the zone 14 since this zone is at a higher in situ compressive stress than the zone 16. However, with continued injection of the solids-laden fluid into the fractures 50a and 50b, these fractures will tend to become plugged with the dehydrated solids as the carrier fluid leaks off through the fracture faces. As resistance to slurry flow into the fracture wings 50a and 50b increases there is minimal tendency for the fractures to grow vertically into the overburden zone 14 due to its higher stress and the accumulation of solids, particularly along the upper region of the fracture. However, with continued pumping, the pressure in wellbore space 25 will increase. This will permit the fracture wings 51a and 51b to develop and extend downwardly into the underburden zone 18. Fluid will not tend to flow upward toward the zone 14 since the fracture wings 50a and 50b are plugged with filter cake or solids material, generally designated by the numeral 60. The arrows extending from the perforations 44, 46 and 48 also illustrate the general direction of flow of fluid into the fractures 50a, 50b, 51a, 51b and 52a, 52b. The location of the perforations 46 and 48, in communication with the lower or underburden zone 18 will permit growth of the fracture generally downward even though the in situ compressive stress is somewhat higher than in the zone 16 and result in the formation of somewhat lateral conduits formed by the fracture wings 51a, 51b and successively by the fracture wings 52a and 52b. These conduits or paths are indicated by the arrows in the drawing Figure whereby the fracture wings will tend to develop laterally outwardly and under the progressively plugged fracture wings which were formed above.

Near the outward lateral boundaries of the fracture wings 51a, 51b and eventually, the fracture wings 52a and 52b, the injected fluid or slurry will tend to flow back into the zone 16, as indicated in the drawing. As the fracture wings grow longer laterally from the well 24, the fluid pressure near the well will tend to increase and thus tend to widen the solids choked fracture in the disposal zone 16. Additional fluid slurry will periodically move vertically into the zone 16 and become dehydrated as the fluid leaks off through the fracture faces. The solids remaining in the fractures will, of course, be essentially immobile and trapped below the overburden zone 14. It may be preferable, in accordance with the method of the invention, to eliminate the perforations 44 and rely only on the perforations 46 and 48 in the underburden zone 18. This arrangement of the perforations may provide additional assurance that the fractures will not grow or penetrate significantly into or through the overburden zone 14. Penetration into or through the zone 14 will be prevented by the leak-off of fluid through the fracture faces in the zone 16 and the accumulation of filter cake 60 which will block further upward growth of the fracture wings.

The description of the invention and the illustration in the drawing set forth herein are primarily exemplary. For example, the in situ compressive stress versus depth curve or characteristic 10 is exemplary in that what is contemplated by the present invention generally requires that a disposal zone such as the disposal zone 16 have a compressive stress distribution which is generally less than the compressive stress in the zones 14 or 18, particularly the zone 14, and that the permeability of the zone 16 preferably be less than the zone 14 in particular. Moreover, the locations of the perforations 44, 46 and 48 are preferably such as to be at the lower boundary of the zone 16 or solely in the underburden zone 18.

Accordingly, slurries of solids wastes such as drill cuttings, contaminated earth materials and other solids capable of being reduced to a particle size in the range of about 20 to 100 microns may be slurried with a suitable carrier liquid such as sea water, together with suitable dispersants so that a pumpable fluid is provided. This disposal fluid may then be injected into a previously prepared disposal well, such as the well 24, in relatively large quantities into the defined disposal zone 16 which is bounded by, in particular, an overburden zone 14 having a minimum in situ compressive stress greater than that exhibited by the zone 16.

Those skilled in the art will recognize that the above-mentioned method of disposing of slurried solids waste materials and the like will allow relatively large volumes of material to be injected through a single disposal well without unrestrained growth of the hydraulic fractures into an overburden zone or layer of earth material which serves as a protective boundary between the disposal area and zones from which fluids may be produced. The cost per cubic yard of waste material should be reduced as compared with other methods of disposal. Moreover, the availability of disposal zones which have the characteristics of the disposal zone 16 being bounded by zones 14 and 18 having the characteristics described will be probably greater than the type of zones available for other inventive methods which are described hereinabove.

Although a preferred embodiment of the present invention has been described in detail herein, those skilled in the art will also recognize that various substitutions and modifications may be made to the method without departing from the scope and spirit of the invention as recited in the appended claims.

What is claimed is:

1. A method of disposing of solids waste material in an earth formation, comprising the steps of:

injecting a slurry, including particles of said solids waste, into a disposal zone of said earth formation which has an in situ compressive stress lower than an adjacent overburden zone and at a pressure sufficient to hydraulically fracture said earth formation in said disposal zone and to deposit a filter cake of said particles in said fracture adjacent to said overburden zone and continuing the injection of said slurry to progressively increase the fracture extending downwardly from said disposal zone while continuing to deposit a filter cake of said particles in said progressively increasing fracture and without substantially penetrating said overburden zone with said fracture.

2. The method set forth in claim 1 including the step of:

defining said disposal zone to have a permeability which is greater than said overburden zone.

3. The method set forth in claim 1 including the step of:

defining said disposal zone to have an in situ compressive stress which is generally less than the in situ compressive stress of an underburden zone adjacent to and below said disposal zone.

4. The method set forth in claim 1 wherein:

said slurry is injected into said formation through an injection well penetrating said disposal zone.

5. The method set forth in claim 4 wherein:

said injection well includes a casing extending within said disposal zone and an underburden zone below said disposal zone and perforations in said casing for communicating said slurry into said underburden zone.

6. The method set forth in claim 5 wherein:

said casing includes perforations formed therein for communicating said slurry with said underburden zone.

7. The method set forth in claim 5 wherein:

said casing includes perforations for communicating said slurry with said disposal zone.

8. The method set forth in claim 7 wherein:

said perforations for communicating said slurry with said disposal zone are disposed closer to said underburden zone than to said overburden zone.

9. The method set forth in claim 1 including the step of:

reducing the particle size of said solids waste and providing a slurry of a carrier liquid and said particles of said solids waste which will deposit said solids waste in said fracture as a layer of filter cake.

10. A method for disposing of solids waste material in an earth formation comprising the steps of:

defining a formation disposal zone having a minimum in situ compressive stress which is generally less than an overburden zone above said disposal zone and an underburden zone below said disposal zone;

forming a slurry of relatively fine particles of said solids waste material and a carrier liquid; and injecting said slurry into said disposal zone at a pressure sufficient to extend a hydraulic fracture in said disposal zone in such a way that a filter cake of said particles of solids waste material deposits in said fracture to prevent substantial growth of said fracture into said overburden zone, and continuing the injection of said slurry to provide growth of said fracture into said underburden zone laterally through said underburden zone and said disposal zone.

11. The method set forth in claim 10 including the step of:

defining said disposal zone to have a permeability greater than said overburden zone.

12. The method set forth in claim 10 including the step of:

defining said disposal zone to have a permeability greater than said underburden zone.

13. The method set forth in claim 8 wherein:

said slurry is injected into said disposal zone and into said underburden zone through an injection well intersecting said disposal zone and said underburden zone.

14. A method of disposing of a slurry of solids wastes in an earth formation comprising the steps of:

injecting said slurry through a well which extends into an underburden zone of said earth formation disposed generally below a disposal zone in said formation, said formation having an overburden zone generally adjacent to and above said disposal zone and wherein the in situ compressive stresses in said disposal zone are generally less than the in situ compressive stresses in said overburden zone and further wherein the permeability of said disposal zone is generally greater than the permeability of said overburden zone, said injection providing for generally lateral growth of a hydraulic fracture in said disposal zone from injection of said slurry into said underburden zone and without substantial penetration of said fracture into said overburden zone.

15. The method set forth in claim 14 wherein:

said injection well extends through said disposal zone and said injection well includes a casing having perforations in communication with said underburden zone for injecting said slurry into said underburden zone.

16. The method set forth in claim 15 wherein:

said casing includes perforations in communication with at least a lower portion of said disposal zone adjacent to said underburden zone.

* * * * *